No. 716,263. Patented Dec. 16, 1902.
L. MOTT.
SPEED INDICATOR.
(Application filed Feb. 11, 1902.)
(No Model.)
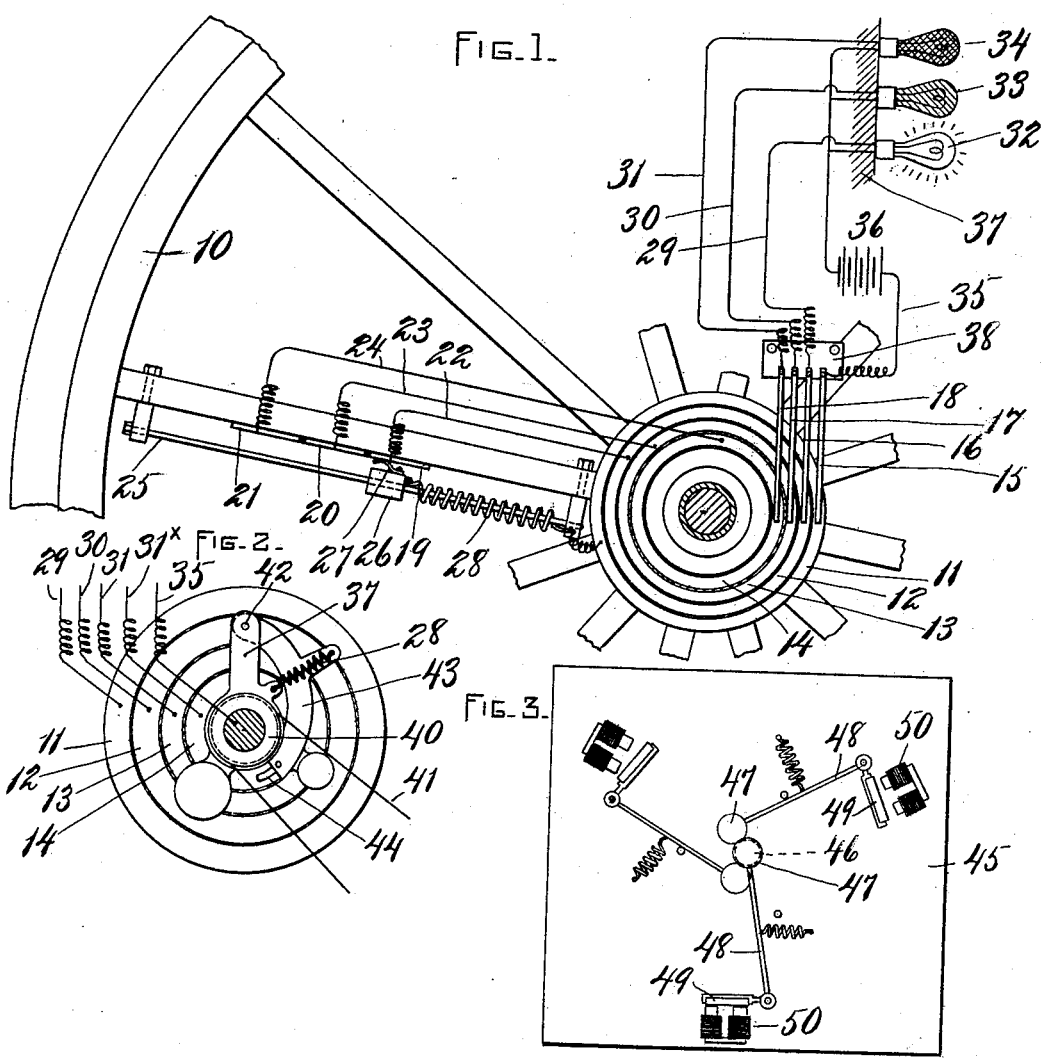
Witnesses:
George Pezzetti
P. W. Pezzetti.
Inventor:
Lawrence Mott
by Wright, Brown & Quinby
attys

UNITED STATES PATENT OFFICE.

LAURENCE MOTT, OF NEW YORK, N. Y.

SPEED-INDICATOR.

SPECIFICATION forming part of Letters Patent No. 716,263, dated December 16, 1902.

Application filed February 11, 1902. Serial No. 93,541. (No model.)

*To all whom it may concern:*

Be it known that I, LAURENCE MOTT, of New York, in the county of New York and State of New York, have invented certain new and useful Improvements in Speed-Indicators, of which the following is a specification.

This invention relates to devices for indicating the speed of vehicles or other running machinery; and it consists in certain novel features of construction and arrangement which I shall now proceed to describe and claim.

Of the accompanying drawings, Figure 1 represents a diagrammatic view of my invention as applied directly to the running-wheel of a vehicle. Fig. 2 represents a side elevation of a modified form. Fig. 3 represents a rear elevation showing a modified form of signal.

The same reference characters indicate the same or similar parts in all the figures.

Referring at first to Fig. 1, 10 represents the wheel of a vehicle on which are mounted concentric with its axis of rotation a series of endless contacts or collector-rings 11 12 13 14, with which are in constant contact a series of collector-brushes 15 16 17 18, mounted on a fixed part or support 38, representing the main part, body, frame, or non-rotating structure of the vehicle. On a radius or spoke of the wheel are arranged a series of contacts 19 20 21, connected by branch circuit-wires 22 23 24 with the collector-rings 12 13 14. 25 is a guide-rod on which is mounted a sliding weight 26, having a contact 27, adapted to coact with the contacts 19 20 21 in succession and yieldingly drawn inwardly by a spring 28. The contact 27 is in circuit through the spring 28 and suitable connections with the collector-ring 11. The brushes 16 17 18 are connected by wires 29 30 31 with one terminal each of a series of glow-lamps 32 33 34, mounted on a part 37 of the non-rotating structure of the vehicle and whose opposite terminals are connected by a common return-wire 35 with the brush 15. In this return-wire is included a battery 36. The globes of the lamps 32 33 34 may be differently colored to correspond to the different speeds which they represent. Thus the lamp 32 may be white, the lamp 33 red, and the lamp 34 blue.

The operation is as follows: When the wheel 10 is standing still or revolving at a very slow speed, the weight 26 is held by the spring 28 in a retracted position. As the speed increases centrifugal force throws the weight outwardly against the tension of the spring and the contact 27 successively comes into coaction with the contacts 19 20 21, thereby closing the corresponding branch circuits and illuminating the corresponding lamps. The speeds with which these lamps correspond may be indicated upon a scale or may be merely known to the attendant, and it is obvious that the illumination of any particular lamp gives an indication of the fact that the vehicle is at or near the corresponding speed. The contacts, branch circuits, and lamps may be provided in any desired number, and they may correspond to greater or less intervals of speed.

In Fig. 2 I represent a modification in which the collector-rings 11 12 13 14 are mounted on a suitable fixed support and connected in a series of branch circuits 29 30 31 31$^\times$, in which are placed a series of lamps or other signals. 37 is a support suitably journaled and provided with a pulley 40, connected by a belt 41 (or otherwise connected) with the device or machine whose speed is to be measured. Pivoted at 42 to said support is an arm 43, moved inwardly by a spring 28 and moved outwardly by the action of centrifugal force as the support 37 is speeded. The arm 43 has a contact 44, connected with the return-wire 35 of the branch circuits and adapted to make contact successively with the several collector-rings. Of course if the support 37 be considered as forming a part of or mounted on the running-wheel of a vehicle and the fixed support on which the rings 11 12 13 14 are mounted be the non-rotating part of said vehicle the transmission-belt 41 would then be dispensed with and the construction would be a near equivalent of that shown in Fig. 1 with a reduced number of parts.

Different forms of signals may be employed. In Fig. 3 I have shown a rear view of mechanism in which 45 is a support having a sight-aperture 46, and 47 47 are a series of normally-retracted semaphores, each of which is mounted on a pivoted lever 48, having the armature 49 of an electromagnet 50. The faces of these semaphores may be painted in different colors. Their magnets 50 are included in the several branch circuits 29 30, &c., so that when any particular speed is reached and the corresponding branch circuit energized one of the semaphores 47 will appear through the aperture 46.

It is obvious that the globes of the lamps 32 33 34 or the faces of the semaphores 47 could be numbered to represent the speeds to which they correspond.

The magnets 50 might operate some other form of signal than a semaphore.

Various other modifications may be made without departing from the spirit of my invention.

One of the principal advantages of mounting the centrifugally-actuated device on the running-wheel of the vehicle is that it dispenses with a troublesome driving connection which would have to be employed between the wheel and the centrifugal device in order to properly drive said device were the latter mounted on the vehicle-body. Although I do not wholly restrict myself to the employment of a circuit as the intermediary or connection between the centrifugal device and the signaling device when the former is mounted on the vehicle-wheel, yet this is a preferred medium, inasmuch as I am enabled to carry the circuit partly on the rotating and partly on the fixed support, which allows of a simple arrangement, as described, for preserving the continuity of said circuit between the rotating and non-rotating parts, whereby the complexity and friction incident to other forms of connection are avoided. The signaling devices controlled by the circuits may be located at any suitable distance from the rotating part. When signals controlled by circuits are employed, exact indications of speed are not given at all points, although by multiplying the signaling-units within a given range the exactness of indication may be increased; but this system has the advantage over indicators or signals consisting of a dial and traveling pointer or equivalents of momentary stability for the individual indications and of the contrast to the senses afforded by appearing and disappearing indications, which makes the system particularly desirable for use on automobiles where the driver's attention must be mainly directed to the road and the control of the vehicle.

I claim—

1. In a speed-indicator, the combination of a rotary support, a relatively fixed support, conductors forming parts of a circuit and carried respectively by each of said supports, a signal on said fixed support controlled by said circuit, mechanism mounted on said rotary support for governing said circuit and movable in different degrees thereon according to the different speeds of said support, and means to preserve the continuity of said circuit between said supports.

2. In a speed-indicator, the combination of a rotary support, a relatively fixed support, conductors forming parts of a plurality of circuits and carried respectively by each of said supports, a plurality of contrasting signals on said fixed support controlled by the respective circuits, mechanism mounted on said rotary support for governing said circuits and movable thereon in different degrees according to the different speeds of said support, and means to preserve the continuity of said circuits between said supports.

3. In a speed-indicator, the combination of a rotary support, a relatively fixed support, conductors forming parts of a plurality of circuits and carried respectively by each of said supports, a plurality of contrasting-signals on said fixed support controlled by the respective circuits, centrifugally-actuated mechanism mounted on the rotary support for governing said circuits respectively at different speeds of said support, and means to preserve the continuity of said circuits between said supports.

4. In a speed-indicator, the combination of a rotary support, a relatively fixed support, conductors forming parts of a circuit and carried respectively by each of said supports, an electric lamp on said fixed support controlled by said circuit, continuously-contacting conductors on the respective supports for preserving the continuity of said circuit between said supports, a centrifugally-actuated device on the rotary support, and contacts on said rotary support included in said circuit and adapted to be brought together by said device, whereby a continuous illumination of the lamp is secured when said contacts are together.

In testimony whereof I have affixed my signature in presence of two witnesses.

LAURENCE MOTT.

Witnesses:
R. M. PIERSON,
GEORGE PEZZETTI.